United States Patent
Rubin et al.

(10) Patent No.: US 10,820,744 B2
(45) Date of Patent: Nov. 3, 2020

(54) BREWING MODULE, CAPSULE RECOGNITION MODULE, AND BEVERAGE PREPARATION MACHINE

(71) Applicant: Qbo Coffee GmbH, Wallisellen (CH)

(72) Inventors: Andres Rubin, Bubikon (CH); Dominic Zwicker, Nesslau (CH); Pascal Tanner, Schmerikon (CH); Claudio Foscan, Rapperswil-Jona (CH)

(73) Assignee: QBO COFFEE GMBH, Wallisellen (CH)

( * ) Notice: Subject to any disclaimer, the term of this patent is extended or adjusted under 35 U.S.C. 154(b) by 322 days.

(21) Appl. No.: 15/531,591

(22) PCT Filed: Nov. 17, 2015

(86) PCT No.: PCT/EP2015/076812
§ 371 (c)(1),
(2) Date: May 30, 2017

(87) PCT Pub. No.: WO2016/087190
PCT Pub. Date: Jun. 9, 2016

(65) Prior Publication Data
US 2017/0325620 A1   Nov. 16, 2017

(30) Foreign Application Priority Data

Dec. 1, 2014   (EP) .................... 14195680

(51) Int. Cl.
*A47J 31/44*   (2006.01)
*A47J 31/36*   (2006.01)

(52) U.S. Cl.
CPC ....... *A47J 31/4492* (2013.01); *A47J 31/3633* (2013.01); *A47J 31/3638* (2013.01); *A47J 31/3676* (2013.01); *A47J 31/3695* (2013.01)

(58) Field of Classification Search
CPC ................ A47J 31/4492; A47J 31/3676; A47J 31/3695; A47J 31/3604; A47J 31/3623; A47J 31/3633; A47J 31/3638
(Continued)

(56) References Cited

U.S. PATENT DOCUMENTS

| 7,461,584 B2 | 12/2008 | Blanc et al. |
| 2012/0187195 A1 | 7/2012 | Actis et al. |
| 2016/0166105 A1* | 6/2016 | Bugnano ............ B65D 85/8043 426/232 |

FOREIGN PATENT DOCUMENTS

| CN | 201452870 | 5/2010 |
| CN | 104168804 | 11/2014 |

(Continued)

OTHER PUBLICATIONS

English Translation of International Preliminary Report on Patentability dated Jun. 6, 2017 (Jun. 6, 2017), Application No. PCT/EP2015/076812, 6 pages.

*Primary Examiner* — Reginald Alexander
(74) *Attorney, Agent, or Firm* — Rankin, Hill & Clark LLP (57) ABSTRACT

A brewing module for a beverage-preparing machine includes a housing and first and second module parts. The housing has a capsule insertion opening through which the capsule can be inserted. The brewing module parts are movable relative to one another to form a brewing chamber in a first position. After movement from the first position to a second position a capsule located in the brewing chamber falls downward into a capsule container by the action of gravity while, in the second position, the brewing module parts cause a capsule inserted through the capsule insertion opening to be stopped vertically above a height of the brewing position at a capsule detection position. In a third position, a capsule at the capsule detection position can fall (Continued)

downward from the capsule detection position, substantially to the height of the brewing position. The second position is between the first position and the third position.

13 Claims, 5 Drawing Sheets

(58) Field of Classification Search
 USPC .............................. 99/289 R, 295, 280, 282
 See application file for complete search history.

(56) References Cited

FOREIGN PATENT DOCUMENTS

| | | | |
|---|---|---|---|
| EP | 1 593 329 | 11/2005 | |
| EP | 1 786 303 | 4/2008 | |
| EP | 2 077 087 | 7/2009 | |
| EP | 2 253 253 | 11/2010 | |
| WO | 00/44268 | 8/2000 | |
| WO | 2005/079638 | 9/2005 | |
| WO | 2008/012316 | 7/2008 | |
| WO | 2010/004376 | 1/2010 | |
| WO | 2010/032271 | 3/2010 | |
| WO | 2010/118544 | 10/2010 | |
| WO | 2010/118545 | 10/2010 | |
| WO | 2012/123440 | 9/2012 | |
| WO | 2013/042011 | 3/2013 | |
| WO | 2013/110206 | 8/2013 | |
| WO | 2015/039258 | 3/2015 | |
| WO | 2015/048914 | 4/2015 | |
| WO | WO-2016038474 A1 * | 3/2016 | .......... A47J 31/3638 |
| WO | WO-2016087474 A1 * | 6/2016 | .......... A47J 31/3633 |

* cited by examiner

BREWING MODULE, CAPSULE RECOGNITION MODULE, AND BEVERAGE PREPARATION MACHINE

BACKGROUND OF THE INVENTION

Field of the Invention

The invention relates to extraction appliances for preparing drinks or the like, from an extraction material, for example ground coffee, which is contained in a capsule. In particular, it relates to a brewing module for an extraction appliance, to a capsule recognition module, as well as to a drinks preparation machine with such a brewing module and/or capsule recognition module.

Description of Related Art

Extraction appliances for preparing drinks or the like, from an extraction material which is present in a portion package, are known, for example, as coffee machines or espresso machines. In many corresponding systems, the portion packages are designed as capsules, in which the extraction material is sealed for example in an airtight manner. For extraction, the capsule is pierced, for example at two sides, which are opposite to one another. An extraction fluid—generally hot water—is introduced at the first side. The extraction product is discharged from the capsule at the second side. This takes place in a so-called brewing module. Such a module includes a brewing chamber, in which the capsule is received. Brewing modules, with which the capsule is inserted and the brewing chamber is closed manually by way of an operating lever or automatically in a motorised manner are particularly popular, wherein the capsule is automatically removed from the brewing chamber and ejected into a capsule container, after the brewing procedure on renewed opening of the brewing chamber. Such brewing modules with an automatic capsule ejection are generally designed as horizontal brewing modules, i.e. the insertion of the capsule is effected from above, the closure of the brewing chamber is a horizontal relative movement of two brewing chamber parts, the brewing fluid flows essentially horizontally and the capsule container is formed below the brewing chamber.

A drinks preparation machine, which includes a positioning device for holding a capsule inserted into the machine, in an intermediate position outside the brewing module, is known from WO 2012/123440. In this intermediate position, a sensor arrangement can read out information that is present on the capsule for example and activate an automatic transfer of the capsule into the brewing module and start the brewing process, depending on the result of the read-out. This procedure has the advantage that a capsule recognition and a brewing process, which is adapted to the recognised capsule, are possible. However, the relatively complicated mechanisms, which are required for a meaningful implementation and which either have several units, which are motorically driven independently of one another or a coupling mechanism rendering an insertion of the capsule during a brewing process not possible, are disadvantageous.

EP 1 786 303 likewise discloses a drinks preparation device with a sensor arrangement for detecting characteristics of an inserted portion package in the form of a pod. The brewing module includes two brewing module parts, which are pivotable to one another. Due to this pivotability, the brewing chamber formed between the brewing module parts can be open to the top, closed or open to the bottom for the ejection of the portion package. After insertion, the portion package is held in an intermediate position on the upper side of the brewing module parts, in a manner laterally guided, and the detection of the characteristics takes place there. Inasmuch as the portion package has been recognised, the brewing chamber is subsequently opened to the top by way of pivoting the brewing module parts, so that the portion package can drop into the brewing chamber, whereupon the brewing chamber is closed by a renewed pivoting movement running in the opposite direction. The brewing process is then carried out and the brewing chamber is subsequently opened to the bottom by way of continuing the pivoting movement, by which means the portion package is ejected to the bottom.

This procedure is suitable for the relatively flat portion packages known as pods. However, it cannot be applied to beaker-like or, for example, cuboid portion capsules without further ado.

SUMMARY OF THE INVENTION

It is an object of the invention, to provide a drinks (beverage) preparation machine that overcomes disadvantages of the state of the art and permits the detection of characteristics of an applied portion capsule before the brewing process, by way of an as simple as possible design.

A brewing module according to the invention, for a drinks preparation machine for preparing a brewed drink from a portion capsule comprises:

a housing which includes a capsule insert opening, through which opening the capsule, for example in a defined orientation, can be inserted;

a first brewing module part and a second brewing module part, which is movable relative to this, wherein a brewing chamber, which during the brewing process at least partly surrounds the capsule located in the brewing position, can be formed by the first and the second brewing module part, wherein the brewing module is designed to brew a brewed drink by way of introducing a brewing fluid into the capsule, and to discharge the brewed drink out of the capsule;

wherein the first and second brewing module part are movable relative to one another between three different, defined positions, wherein the brewing chamber is formed in the first position, wherein after a movement from the first into the second position, a capsule located in the brewing chamber drops downwards into a capsule container due to the effect of gravity, wherein however in the second position, the brewing module parts have the effect that a capsule inserted through the capsule insert opening is held vertically above a height of the brewing position, at a capsule recognition position, wherein in the third position, a capsule located at the capsule recognition position can drop down from this, essentially to the height of the brewing position and wherein the second position is between the first position and the third position.

The first position corresponds to the closed condition of the brewing chamber. What is new about the approach according to the invention is that there are two different, defined conditions, in which the brewing chamber is opened and a capsule can drop downwards after the brewing process. These conditions with an opened brewing chamber are defined by the second and third position. In the second position, the brewing chamber is open to the bottom, but quasi closed to the top for the insertion of the capsule, and only in the third position is it completely open to the top and the bottom.

The position, into which the capsule drops from the capsule recognition position when the brewing module parts are in the third position, can directly be the brewing position. However, one can also envisage the capsule dropping into an intermediate position, in particular at the vertical height of the brewing position and only being displaced into the brewing position on closing the brewing chamber, i.e. the transfer of the brewing module parts into the first position.

The capsule can be guided on dropping from the capsule recognition position, and is stopped at the height of the brewing position and/or—as the case may be—the intermediate position, which can be effected by way of laterally engaging, pivotable or non-pivotable guide means, such as described for example in WO 2105/048914, or also by way of other means as are known for example from WO 2013/110206, or, as the case may be also according to WO 2010/118545, by way of a rest which simultaneously forms a delimitation of the brewing chamber.

The brewing module can include capsule recognition means, in order to recognise characteristics of a capsule located in the capsule recognition position, on the basis of predefined features. With capsule recognition means, in particular one can firstly determine whether the inserted capsule is suitable for use in the drinks preparation machine in the first place, or not—and this is known per se. Secondly, there exists the possibility of issuing corresponding information to the user, for example via a display, on the basis of the recognised capsule characteristics. For example, the drink type (coffee, tea, etc.), the sort (e.g. "100% Arabica"), the recommended preparation manner (e.g. "espresso", "ristretto" or "lungo" etc.) and/or other information can be displayed. Thirdly, the program, which is implemented by the coffee machine for the brewing, can be selected on the basis of the recognised capsule sort, for example the brewing pressure, the brewing duration as well as possibly also the temperature and/or other characteristics can be set depending on whether the inserted capsule is envisaged for the preparation of e.g. ristretto, espresso or lungo.

The capsule recognition means can detect optical and/or other characteristics of the capsule. Magnetic characteristics and/or an RFID chip readable in a contact-free manner can also be applied as recognition features, apart from suitable optically readable features, for example a bar code, a 2D matrix code (for example QR code or Aztec code), a pictogram (icon), a code according to one of the European patent applications 14 197 487.3, 14 197 488.1 and/or 14 197 489.9 and/or a certain colouring.

The procedure according to the invention has the advantage that a new capsule can be inserted when the brewing module parts are in the first position (the brewing chamber is closed, for example during the brewing process), as well as when the brewing module parts are in the second position or whilst they are moved from the first into the second position, thus for example after completion of the brewing process. For example, the capsule recognition process for a second capsule can therefore begin whilst the brewing process for a first capsule is still in process.

Despite this advantage, the brewing module or the drinks preparation machine makes do without additional moving parts, and a single drive is sufficient.

In particular, the movement of the brewing module parts relative to one another is a linear movement, i.e. a translation along an axis. A pivotability of the brewing modes parts is not necessary due to the approach according to the invention, but is also not ruled out.

In particular, the brewing module is a horizontal brewing module, and the axis of the movement in particular is an essentially horizontal axis, i.e. it runs parallel to the surface, on which the drinks preparation machine is placed, or roughly parallel to this, for example up to an angle of maximal 20°.

The first, second and the third brewing position can be defined mechanically, by way of stops and/or as latching positions or the like.

In embodiments, the drive for the movement of the brewing module parts relative to one another in particular is an electrical drive. In these embodiments, the first, second and/or third position, in particular the second position, can also be defined electronically, by way of the electrical drive being programmed such that it moves the brewing module parts relative to one another, in each case by a predefined movement path. In such embodiments, the activation of the electrical drive for example likewise belongs to the brewing module, even if, with regard to its location, it is present at another location of the drinks preparation machine and is integrated for example into the activation of the complete machine.

The activation of the drive in particular can be programmed such that a moving into the third position is not effected until after a capsule recognition procedure has been effected and that the brewing module parts always travel from the first into the second position after the brewing procedure has been effected, unless a capsule recognition procedure with a next capsule has already taken place during the brewing procedure.

According to an embodiment example, a pinion driven by an electric motor moves a pivot lever with a toothing matching with the pinion, the pivot lever being connected to a lever arm of a toggle lever or forming this. The toggle lever effects a translation movement of the brewing module part between the first position and the third position.

In many embodiments, one of the brewing module parts (hereinafter "the stationary brewing module part", for example the discharge device) is assembled in a manner in which it is fixed to the housing, whilst the other brewing module part (hereinafter "the moved brewing module part", for example the injector) is moved with the transition between the positions. The relative movement of the brewing module parts to one another is then therefore effected by way of the movement of only the moved brewing module part.

The circumstance that the brewing module parts have the effect that a capsule inserted through the capsule insert opening is stopped vertically above the brewing position at a capsule recognition position, can be accomplished, for example, by way of a rest portion of one of the brewing module parts—in particular of the moved brewing module part. Such a rest portion can block an insertion path downwards from the capsule recognition position to such an extent that the capsule cannot drop further downwards. If, as is known per se, the capsule is guided in its orientation by way of suitable lateral guide means, then this can be effected by a portion of the moved brewing module part, which in the second position projects only slightly into the insertion path. On account of this, the brewing module in particular can be designed such that the rest portion is fixedly connected to the remainder of the brewing module part and for example even designed as one piece with this, and thus makes do without moving parts between the rest portion and the portions of the brewing module part that co-form the brewing chamber.

In embodiments, an element of the one brewing module part, which at the upper side projects towards the other brewing module part, forms the rest portion.

A capsule recognition module can be applied for reading out capsule characteristics at the capsule recognition position. Such a capsule recognition module can include an optical sensor, in particular a camera for detecting optical characteristics of the capsule. A window (capsule recognition window) of a transparent material, which protects the camera from water vapour and contamination, can be present between the camera and the capsule located at the capsule recognition position.

In embodiments, an active fan for producing an airflow at the side of the capsule recognition window, which is towards the capsule recognition position, is also present.

A fogging of the capsule recognition window is efficiently prevented by way of such a fan. It has been found that the reliability of the capsule recognition can be significantly improved by way of this measure, which per se is quite simple.

A capsule recognition window of the mentioned type can be arranged at a non-right angle for example of 80° at the most, to an axis between the capsule recognition position and the optical sensor. Reflections of the light source at the window are not visible from the location of the optical sensor on account of this.

Here, the axis between the capsule recognition position and the optical sensor is to be understood as an axis in the optical sense, i.e. in the case of light deflecting means between the capsule recognition position and the sensor, the axis does not necessarily correspond to a direct connection, but to a beam path of a light beam which goes along the shortest path, from the middle of a surface of the capsule at the capsule recognition position, said surface being detected by the camera, to the middle of the sensor. If the optical sensor is a camera with camera optics, then the axis can coincide with an optical axis (axis of symmetry) of the camera optics.

A capsule recognition module can moreover include at least one light source for illuminating the capsule at the capsule recognition position, in particular behind the capsule recognition window, i.e. at the side of the capsule recognition window that is towards the optical sensor. Such a light source can, for example, include an LED or a number of LEDs. A light diffuser can be present between the light source and the capsule recognition position, for example likewise behind the window, in order to prevent any occurring reflections on the capsule, particular in cases, in which the capsule surface acts in a slightly reflecting manner.

The invention also relates to a drinks preparation machine with a brewing module according to the invention.

BRIEF DESCRIPTION OF THE DRAWINGS

Embodiment examples of the invention are hereinafter described by way of the figures. In the figures, the same reference numerals describe the same or analogous elements. There are shown in.

DETAILED DESCRIPTION OF THE INVENTION

Figure 1:
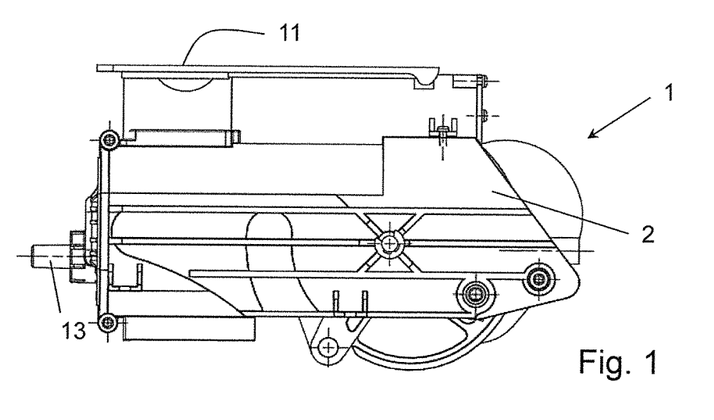
FIG. 1 is a lateral view of the brewing module.
Figure 2:
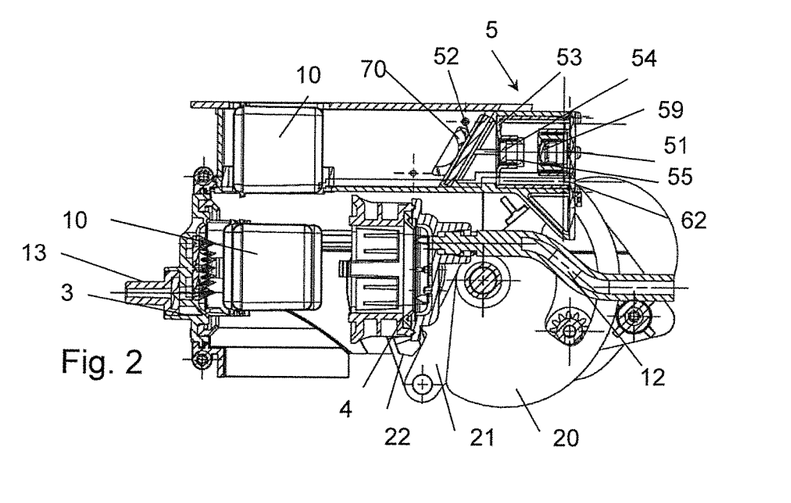
FIG. 2 is a sectioned representation of the brewing module of FIG. 1, sectioned along the plane II-II in FIG. 3.
Figure 3:
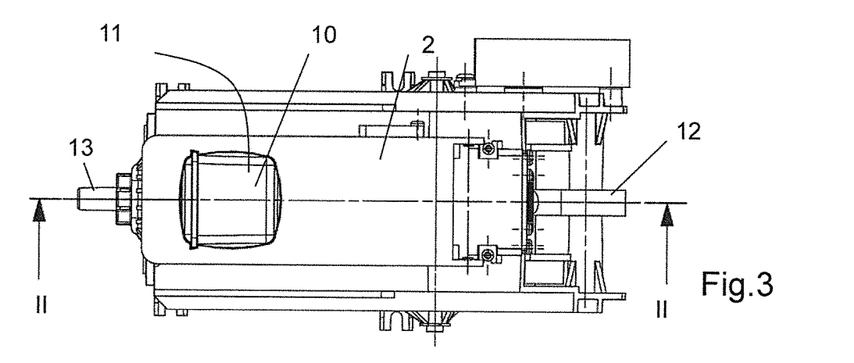
FIG. 3 is a view of the brewing module of FIG. 1, from above.
Figure 4:
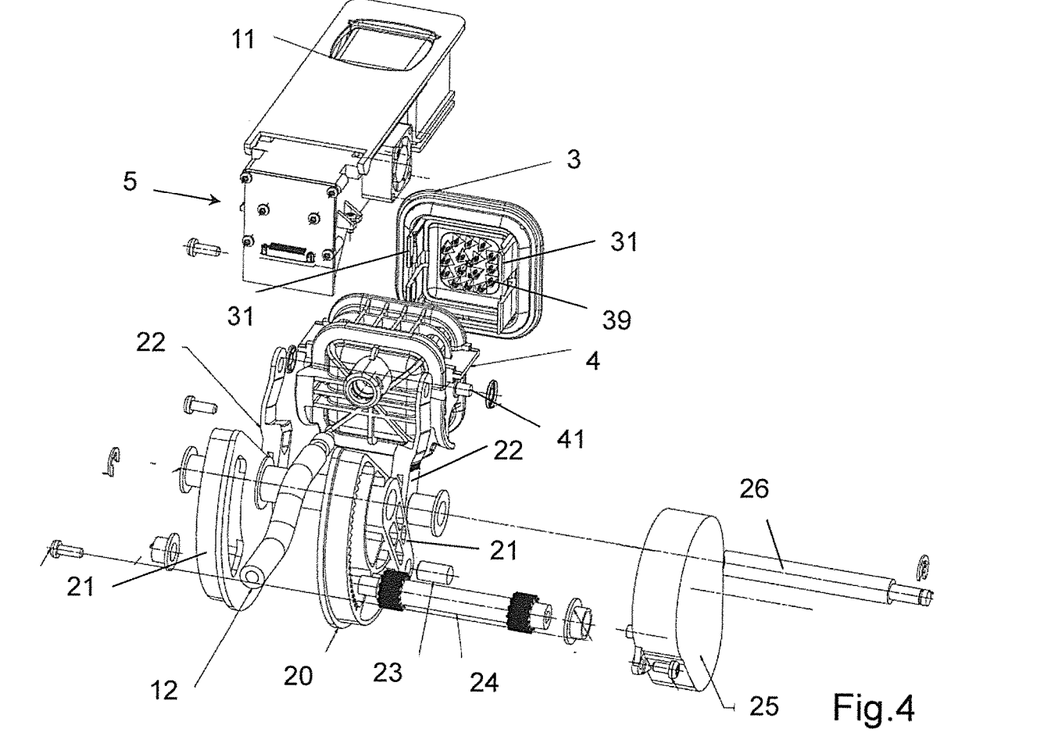
FIG. 4 is an exploded representation of elements of the brewing module according to FIGS. 1-3 (without some of the housing parts)

The brewing module 1 according to FIGS. 1-3, whose elements are to be seen in FIG. 4 in an exploded representation (wherein some elements, in particular housing parts, have been omitted), includes an outer brewing module housing 2. In the represented embodiment example, this is composed of an upper housing part (capsule recognition housing) and of a lower housing part (brewing chamber unit housing). Two brewing module parts, specifically a discharge device 3 and an injector 4 and which are movable relative to one another, are guided in the brewing module housing 2.

The injector 4 includes perforation elements for piercing a capsule 10, which is able to be introduced into the brewing module via an insert opening 11 and which is at least partly filled with extraction material, for example ground coffee. The injector 4 is designed to introduce a fluid—for example hot water—through the perforation elements or past these, into the pierced capsule, wherein the water can be fed via a water feed 12, which, for example, can include flexible tubing.

With the embodiment example described here, the discharge device 3 also includes perforation elements, specifically extraction side piercing tips 39. These can be designed for example as is described in WO 2015/039258 or in WO 2010/118544, or have another design, and the application of principles other than piercing tips, of example with grating-like structures are also possible.

The discharge device moreover includes guide means 31, which, at both sides of the capsule, project towards the injector side, as are described for example in WO 2015/048914, the contents of which relating to the manner of functioning of these guide means as well as to the respective retrieval means of the injector being expressly referred to here.

As is known per se, for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel, which is placed therebelow for example.

The relative movement of the brewing module parts—the discharge device and the injector—in the embodiment example described here is achieved by way of the discharge device 3 being assembled in a manner in which it is fixed to the housing, whereas the injector 4 is movable along the horizontal axis. The drive of the injector is effected via a toggle lever driven in a motorised manner. A pinion shaft 24, which is in connection with an electric motor (not visible in the figures, for example covered by a drive housing 25), drives a toothed drive disc 20, which is connected to a first toggle lever arm 21 in a rotationally fixed manner, so that a pivoting movement of the drive disc 20 about its axis 26 pivots the first toggle lever arm 21 likewise about this axis. A second toggle lever arm 22 is connected at one side to the first toggle lever arm 21 via a toggle lever bolt 23 and at the other side cooperates with a guide pin 41 of the injector 4. Since the injector is mounted by the housing such that it is only linearly displaceable along the essentially horizontal axis, a pivot movement of the drive disc and of the first toggle lever arm therefore effects a stretching or sharp bending of the toggle joint formed by the toggle lever and, on account of this, a linear displacement of the injector 4.

The brewing module, above the brewing chamber unit with the discharge device 3 and injector 4 includes a capsule recognition module 5 with a camera, whose construction and manner of functioning is hereinafter dealt with in more detail.

The course of operation is described by way of FIGS. 5-9.

Figure 5:
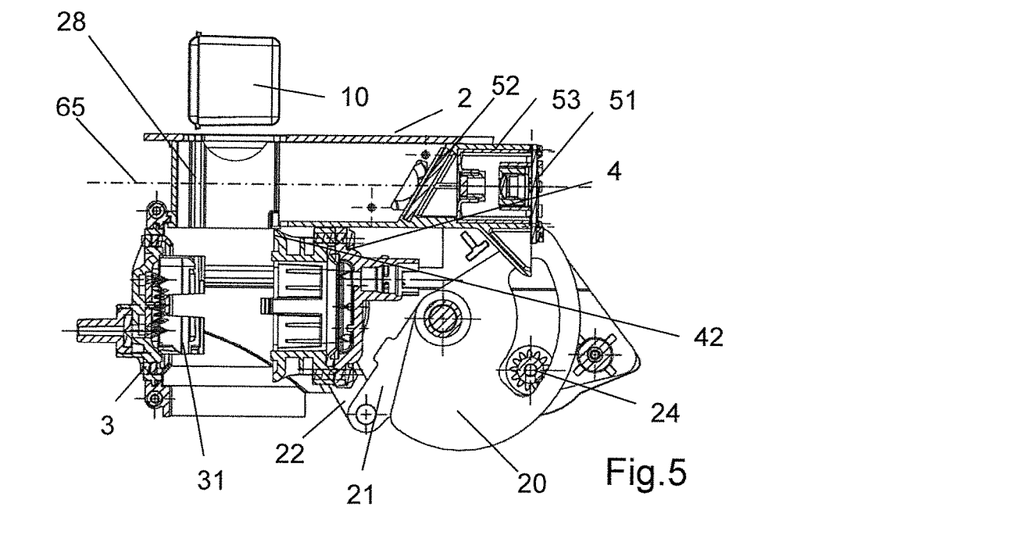
FIGS. 5-9 are, in each case, a sectioned representation of the brewing module according to FIGS. 1-3, during different phases of the operation.

On inserting the capsule 10, the injector 4 is located, for example, at the second position, as is represented in FIG. 5. In this position, although the brewing chamber is opened, the injector however is retracted to the injector side only to such an extent that that a rest portion 42 of the injector 4 holds back the capsule 10 which is guided in the insert opening 11 by way of a lateral guide 28, at the capsule recognition position, which is represented in FIG. 6.

Figure 6:
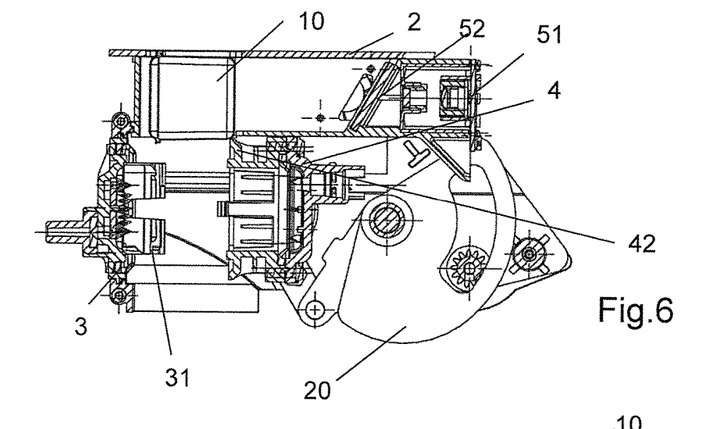

The capsule recognition, which is yet described hereafter, is carried out whilst the capsule 10 is located at this capsule recognition position according to FIG. 6, for which capsule recognition for example an optical feature present on the side of the capsule (capsule base), which faces the injection side is detected.

Figure 7:
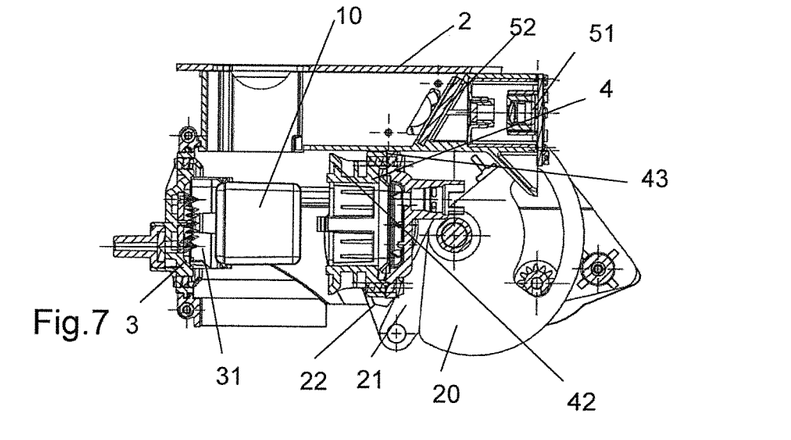
Figure 10:
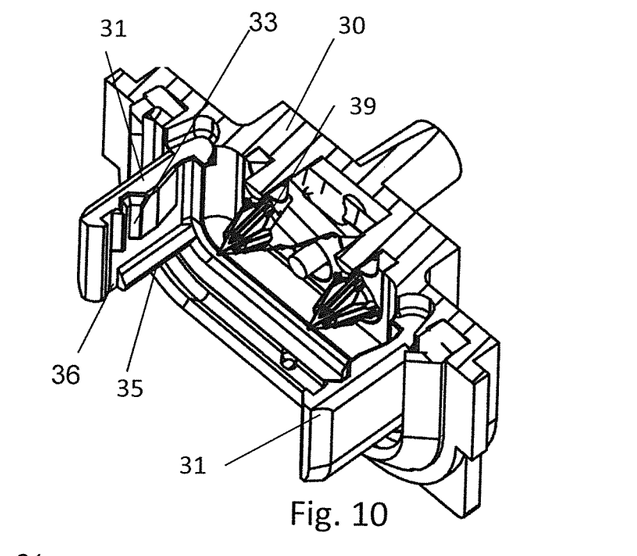
FIG. 10 is a detail of a possible embodiment of a discharge device.

As the case may be and in a manner depending on the result of the capsule recognition, the injector 4 is subsequently moved even further towards the injection side into the third position, which is illustrated in FIG. 7. The rest portion is displaced away from the capsule by way of this, and the capsule can drop downwards. It is stopped at the height of the brewing position by way of a rest of the lateral guide means 31. This can be effected, for example, by way of a rest 35, on which a collar and or another portion of the capsule comes to lie, when this capsule drops downwards, guided with the collar in a (first) track 33 connecting to the lateral guide 28. This principle is illustrated in FIG. 10 and is described in detail in WO 2015/048914.

Figure 8:
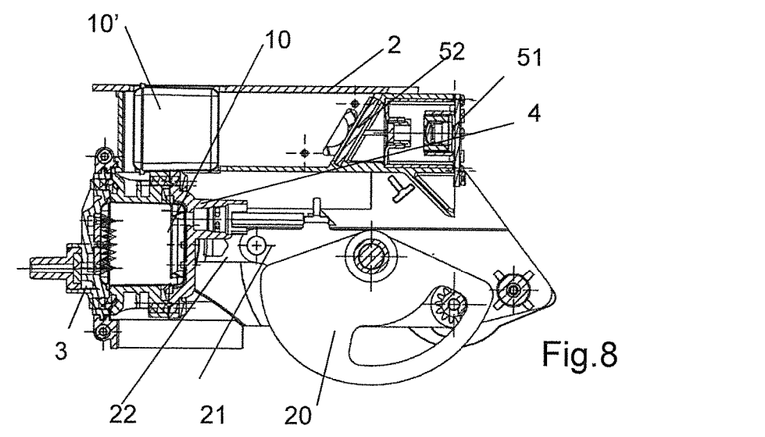

The brewing chamber is subsequently closed after activation by the user or automatically, for which the injector is moved from the third into the first position. FIG. 8 shows the brewing module with the injector in the first position. The capsule 10 is pierced at both sides, and the brewing process takes place, for example by way of hot water being led under pressure into the capsule. On closing the brewing chamber for example, the capsule collar is also displaced out of the mentioned first track 33.

Optionally, a further capsule 10' can already be inserted during the brewing process, and this further capsule then lies on the already mentioned rest portion 42 or on a further rest portion 43 and remains in the capsule recognition position. The recognition of the second capsule 10' can therefore already be effected during the brewing process of the first capsule 10.

Figure 9:
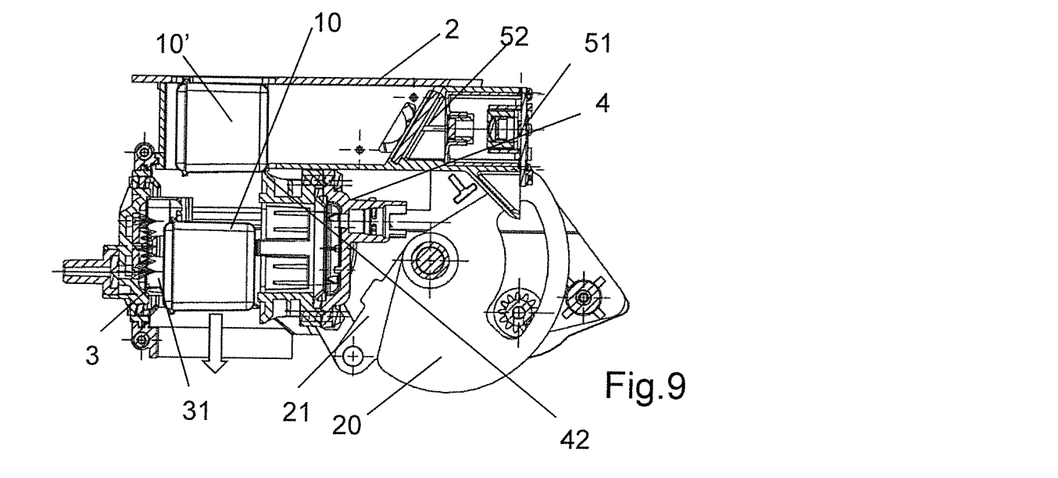

The injector is moved back into the second position after completion of the brewing process. The spent capsule 10 can drop downwards into a capsule container (FIG. 9).

The fact that the spent capsule can drop downwards can be accomplished by way of the capsule position after the brewing process being displaced with respect to the position after the insertion, such that it no longer lies on the rest 35, but the collar for example is guided in a second track 36, as is likewise described in WO 2015/048914. Thereby, the option of the second track 36 running further to the injector side in comparison to the first track 33 and vice versa is also given.

As an alternative to this procedure according to WO 2015/048914, one can also envisage, for example, the lateral guide means being pivoted outwards after completion of the brewing process, or holding or guide means being moved relative to the capsule some other way, on closing the brewing chamber and/or on opening it after the brewing process.

Instead of a movement from the first into the second position, a movement directly into the third position can be effected, if a capsule recognition process of a second capsule, which takes place during a brewing procedure, is already completed.

Figure 11:
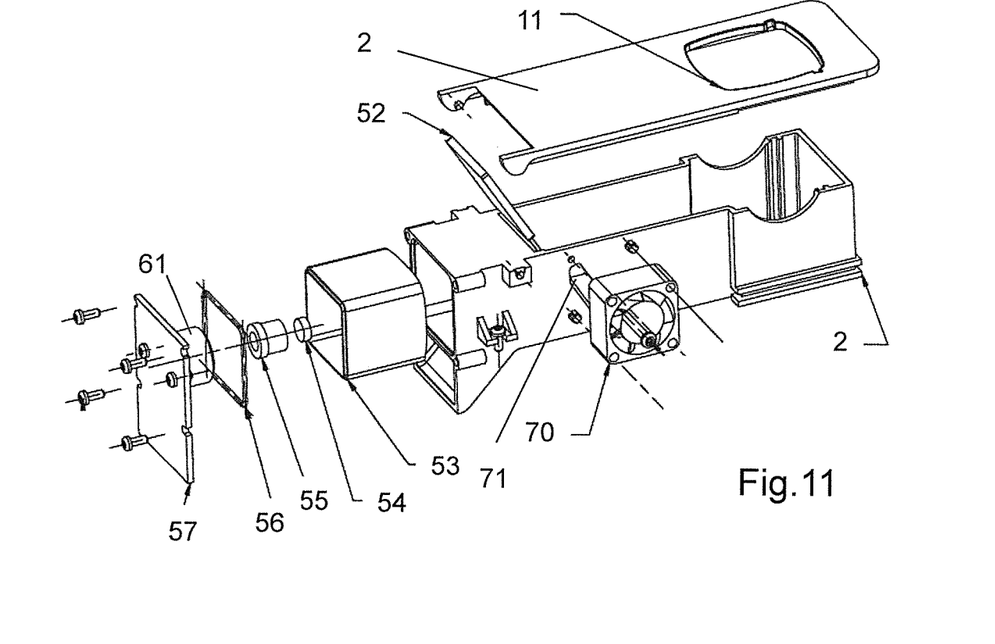
FIG. 11 is an exploded representation of the elements of the brewing module with the capsules recognition module, which are present at the upper side.
Figure 12:
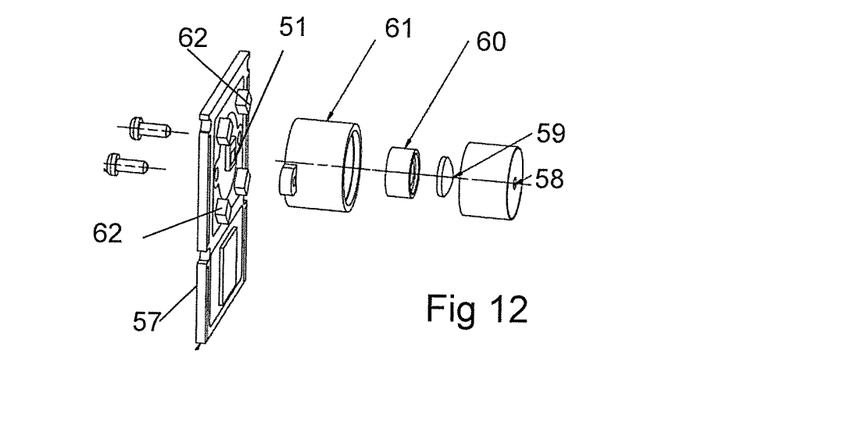
FIG. 12 is an exploded representation of a camera unit of the capsule recognition module.

FIG. 11 shows the capsule recognition module including the respective parts of the housing 2, in an exploded view. FIG. 12 shows parts of the camera, as well as of the illumination means of the capsule recognition module, likewise in an exploded representation. Some of the respective elements are also visible in FIG. 5.

After the brewing procedure, water vapour also gets into the region above the brewing position and into the environment of the capsule recognition position. The capsule recognition module apart from the camera unit therefore also includes a capsule recognition window 52, which separates the camera and, as the case may be other optical or electronic components, from the region, into which water vapour can get.

Amongst other things, several LEDs 62 as light sources are arranged on a circuit board 57, and during the capsule recognition process produce light, which is thrown upon the capsule via a diffuser 53 (cf. also FIG. 5) and a capsule recognition window 52. A suitable, optically readable feature, for example a barcode, a 2D matrix code (for example QR code or Aztec code), another defined code, a pictogram (icon) and/or also a certain colouring, is present on the capsule.

The side of the capsule, which is illuminated by the light sources, is detected by the camera and is evaluated in the camera or by way of a separate module (not represented), which, for example, is likewise present in the coffee machine.

The light that is reflected from the illuminated capsule for this purpose gets through the capsule recognition window 52 and a diffuser window 54 in the diffuser 53 (the diffuser effect exists only around the diffuser window 54—the diffuser widow 54 itself is transparent) to the camera, which includes an aperture 58, at least one lens 59 as well as the camera sensor 51, for example with a CCD or CMOS sensor array, which is likewise present on the circuit board 57.

The diffuser window 54 here is held by a diffuser window holder 55, and the lens 59 is guided in a lens fixation 60, which for its part is held by a lens holder 61 assembled on the circuit board 57. The mechanical details of the camera optics and the design of the diffuser however can also be selected differently without further ado.

An optional sealing frame 56, which together with the diffuser itself, ensures an additional protection of the camera electronics is present between the diffuser 53 and the circuit board 57.

With regard to the capsule recognition position, a fan is located in front of the capsule recognition window 52 and during the capsule recognition procedure and/or before this produces an airflow in front of the capsule recognition window, by way of it sucking or drawing air from outside the coffee machine and blowing it through a slot 71 in the housing 2 to in front of the capsule recognition window 52.

A further feature of the capsule recognition window, for example, is likewise represented in FIG. 11. The capsule recognition window 2 is arranged at a non-right angle to the axis 65 between the capsule recognition position and the camera sensor 51. By way of this, reflections of the light sources are efficiently prevented from being able to superimpose on the image of the capsule on the camera sensor and from being able to adulterate the evaluation. The angle of the capsule recognition window plane to the perpendicular to the axis 65 'capsule recognition position-camera sensor' (defined as the axis going in each case through the middle of the camera sensor surface and the capsule located at the capsule recognition position respectively, see FIG. 5; the axis 65 can coincide with the optical axis of the camera) for example is at least 10°, in particular at least 15°

Figure 13:
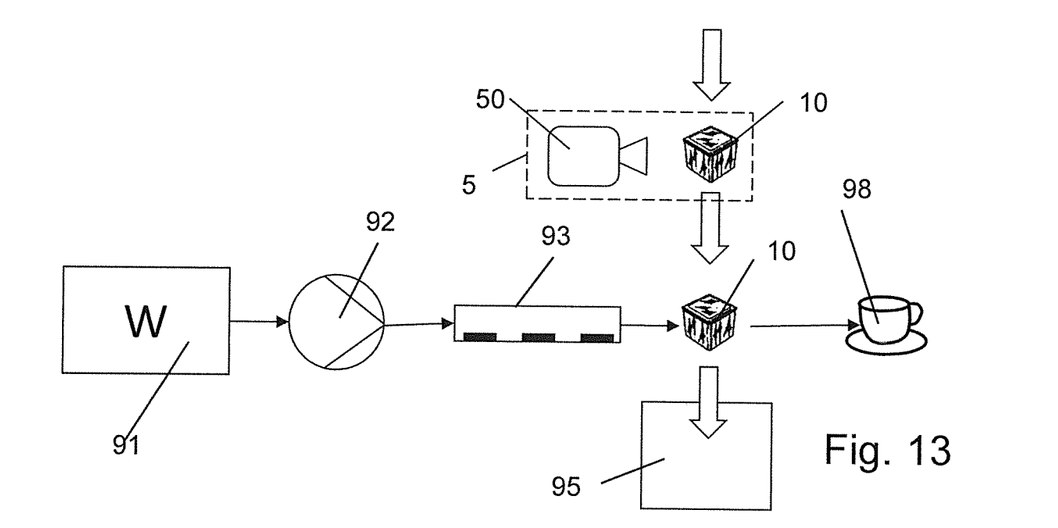
FIG. 13 is a schematic diagram of a drinks preparation machine.

A machine according to the invention, for preparing a brewed drink from a portion capsule, here specifically a coffee machine, with a brewing module, is represented schematically in FIG. 13. Apart from the brewing module, it includes a water tank 91, a pump 92 for feeding brewing water to the injector 4 and a water heating device 93 (for example continuous-flow heater). The capsule recognition module 5 with the camera 50 in particular is located above the brewing chamber. After the capsule recognition process, an inserted capsule can be transported further, downwards by way of the effect of gravity as has been described above.

Moreover, a capsule container 95 into which the capsules 1 drop or are transported during the brewing process is arranged below the brewing module. The reference numeral 98 indicates a coffee cup.

LIST OF REFERENCE NUMERALS 1 brewing module
2 housing
3 discharge device
4 injector
5 capsule recognition module
10 capsule
10' second capsule
11 insert opening
12 water feed
13 drinks outlet
20 drive disc
21 first toggle lever arm
22 second toggle lever arm
23 toggle lever bolt
24 pinion shaft
25 drive housing
26 axis
28 guide
31 guide means
33 first track
35 rest
36 second track
39 extraction-side piercing tips
41 guide pins
42 rest portion
43 further rest portion
50 camera
51 camera sensor
52 capsule recognition window
53 diffuser
54 diffuser window
55 diffuser window holder
56 sealing frame
57 circuit board
58 aperture
59 lens
60 lens fixation
61 lens holder
62 LED
65 axis
70 fan
71 slot
91 water tank
92 pump
93 water heater device
95 capsule container
98 coffee cup

The invention claimed is:

1. A brewing module for preparing a brewed drink from a portion capsule, comprising:
a housing, which defines a capsule insert opening through which opening the capsule can be inserted;
a first brewing module part and a second brewing module part, said second brewing module part being movable relative to the first brewing module part, wherein the first and second brewing module parts are configured to form a brewing chamber at least partly surrounding the capsule when located in a brewing position during the brewing process, wherein the brewing module is designed to brew a brewed drink by way of introducing a brewing fluid into the capsule, and to discharge the brewed drink out of the capsule;
wherein the brewing module is configured for the second brewing module part to move, relative to the first brewing module part, between a first defined position, a second defined position, and a third defined position,
wherein the brewing chamber is formed when the second brewing module part is in the first position,
wherein after a movement of the second brewing module part from the first position into the second position, the capsule located in the brewing chamber drops downwards into a capsule container due to the effect of gravity, wherein, however, the second brewing module part when being in the second position acts to hold a capsule inserted through the capsule insert opening vertically above a height of the brewing position, at a capsule recognition position,
wherein when the second brewing module part is in the third position, a capsule located at the capsule recognition position can drop down from the capsule recognition position, essentially to the height of the brewing position, and
wherein the second position is between the first position and the third position.

2. The brewing module according to claim 1, further comprising a capsule recognition module that is designed to recognize a capsule located in the capsule recognition position, on the basis of predefined features.

3. The brewing module according to claim 2, wherein the predefined features are optical features and the capsule recognition module comprises an optical sensor.

4. The brewing module according to claim 3, wherein the capsule recognition module comprises a capsule recognition window which is of a transparent material and which is arranged between the capsule recognition position and the optical sensor.

5. The brewing module according to claim 4, comprising a fan for producing an airflow on the side of the capsule recognition window which is towards the capsule recognition position.

6. The brewing module according to claim 4, wherein the capsule recognition window is arranged at a non-right angle to an axis between the capsules recognition position and the optical sensor.

7. The brewing module according to claim 4, comprising at least one light source for illuminating the capsule at the capsule recognition position, wherein the light source is arranged at the side of the capsule recognition window that is towards the optical sensor.

8. The brewing module according to claim 7, comprising a diffuser for light produced by the light source.

9. The brewing module according to claim 1, wherein the movability of the second brewing module part relative to the first brewing module part is a purely linear movement.

10. The brewing module according to claim 1, comprising an electrical drive for a movement of the second brewing module part relative to the first brewing module part.

11. The brewing module according to claim 1, comprising a lateral guide for defining an orientation of the capsule at the capsule recognition position, wherein the capsule is laterally guided essentially at the height of the brewing position, on a path between the capsule recognition position and the brewing position or an intermediate position.

12. The brewing module according to claim 1, wherein the second brewing module part includes a rest portion that is connected in a fixed and immovable manner to the second brewing module part, said rest portion projecting into an insertion path of the capsule when the second brewing module part is located in the second position.

13. A drinks preparation machine, in particular a coffee machine, comprising a water feed, a pump and a water heater, as well as a brewing module according to claim 1.

* * * * *